(12) United States Patent
Tanabe et al.

(10) Patent No.: US 7,570,337 B2
(45) Date of Patent: Aug. 4, 2009

(54) DISPLAY DEVICE

(75) Inventors: Hideo Tanabe, Mobara (JP); Masaru Takabatake, Mobara (JP); Hideaki Nakatsuka, Mutsuzawa (JP); Toshiki Kaneko, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 139 days.

(21) Appl. No.: 11/898,278

(22) Filed: Sep. 11, 2007

(65) Prior Publication Data

US 2008/0074594 A1   Mar. 27, 2008

(30) Foreign Application Priority Data

Sep. 21, 2006   (JP)   ............................. 2006-255175

(51) Int. Cl.
G02F 1/1345   (2006.01)

(52) U.S. Cl. ..................................................... 349/149

(58) Field of Classification Search .................. 349/149
See application file for complete search history.

(56) References Cited

U.S. PATENT DOCUMENTS 7,209,209 B2 * 4/2007 Moon .......................... 349/149
7,230,668 B2 * 6/2007 Lee et al. ..................... 349/152

* cited by examiner

Primary Examiner—David Nelms
Assistant Examiner—Phu Vu
(74) Attorney, Agent, or Firm—Reed Smith LLP; Juan Carlos A. Marquez, Esq.

(57) ABSTRACT

In a liquid crystal display device disposed with reflective regions and transmissive regions, two organic insulating films are formed on a connection terminal portion and radial non-uniformities are prevented from occurring when applying the upper organic insulating film. Pixel portions including transmissive regions and reflective regions are formed, and a second organic insulating film is formed between a metal layer that forms reflective electrodes and a transparent conductive film that forms pixel electrodes to planarize concavo-convexities in the reflective electrodes. In contact holes of a connection terminal portion, the inclination of a first organic resin film is made smooth to control the occurrence of radial non-uniformities occurring in the second organic insulating film.

6 Claims, 16 Drawing Sheets

36  166  2

36  161  2

44
36  166  2

44
36  161  2

DISPLAY DEVICE

BACKGROUND OF THE INVENTION

1. Field of the Invention

The present invention relates to a display device and in particular to a transflective type liquid crystal display device disposed with a conductive film on two insulating films.

2. Background Art

In recent years, so-called transflective type liquid crystal display devices disposed with the two display systems of a reflective display and a transmissive display have been heavily used as display units in portable devices, for example.

Transflective type liquid crystal display devices are disposed with a transmissive region and a reflective region in a single pixel. In a transflective type display, a transmissive mode and a reflective mode are mixed. In the transmissive mode, light passes through the transmissive region disposed in the pixel and reaches the eyes of the viewer. In the reflective mode, light is reflected by the reflective region and reaches the eyes of the viewer.

These transflective type liquid crystal display devices are effective when used outdoors and the like. During use in an environment where the surroundings are bright, transflective type liquid crystal display devices perform display in the reflective mode in addition to the transmissive mode and utilize outside light for display.

Transmissive type liquid crystal display devices have the problem that visibility outdoors on a clear day, for example, drops when the outside light is extremely bright. Reflective type liquid crystal display devices have the problem that visibility drops extremely when the outside light is dark.

Transflective type liquid crystal display devices combine the functions of both the reflective type and the transmissive type as means for solving these problems.

In transflective type liquid crystal display devices, an active matrix system using thin film transistors (called "TFTs" below) as switching elements for selectively supplying video signals to pixel electrodes is widely used.

Active matrix liquid crystal display devices include a TFT substrate and a color filter substrate. TFTs and pixel electrodes are formed on the TFT substrate, and color filters for performing color display are disposed on the color filter substrate. The TFT substrate and the color filter substrate are disposed facing each other, and a liquid crystal composition is sealed between these substrates. Plural video signal lines and plural scan lines intersect each other and are disposed on the TFT substrate. The regions partitioned by the video signal lines and the scan lines are called pixel regions. The plural pixel regions are disposed in a matrix. Additionally, a TFT and a pixel electrode are disposed in each pixel region.

In liquid crystal display devices, opposing electrodes are disposed so as to face the pixel electrodes, and electric fields are generated between the pixel electrodes and the opposing electrodes. Display is performed utilizing the phenomenon that the orientation directions of the liquid crystal molecules are changed by these electric fields and the characteristics of the liquid crystal layer with respect to light change in accompaniment therewith.

The vertical electric field system, where the opposing electrodes are disposed on the color filter substrate, and the in-plane switching (IPS) system, where the opposing electrodes are disposed on the TFT substrate, are commonly known.

In transflective type liquid crystal display devices, sometimes an organic resin film is used as an insulating film. With transflective type liquid crystal display devices, it is necessary to halve the thickness of the liquid crystal layer in the reflective regions with respect to the transmissive regions. For that reason, the organic resin film is disposed as a thick interlayer insulating film under the reflective regions with the purpose of making the liquid crystal layer thin.

Further, among transflective type liquid crystal display devices, devices where a retardation layer is disposed in the reflective regions or the transmissive regions are in development. These devices attempt to adjust, with the retardation layer, optical retardations that arise in the reflective regions and the transmissive regions.

Transflective type liquid crystal display devices have been proposed by JP-A-2005-259371 and the like, for example.

SUMMARY OF THE INVENTION

In transflective type liquid crystal display devices, a transmissive region and a reflective region are formed in a single pixel, and a metal film is patterned in the reflective regions and used as reflective electrodes.

Further, concavo-convexities for scattering light are formed in the reflective regions, and when the pixel electrodes are formed on the reflective regions, the problem arises that irregularity also arise in the pixel electrodes because of the concavo-convexities.

Particularly in transflective type liquid crystal display devices disposed with a retardation layer, it is not necessary to halve the thickness of the liquid crystal layer at the reflective regions in comparison to the transmissive regions, and the thickness of the organic resin film of the reflective regions becomes thinner than has conventionally been the case, so changes in image quality resulting from concavo-convexities in the reflective regions become conspicuous.

For that reason, the present inventor attempted forming a second organic resin film to planarize the concavo-convexities. In the attempt to planarize these concavo-convexities, the present inventor discovered a problem in that, when the second organic resin film is applied to the first organic resin film, the film thickness of the second organic resin film does not become uniform and radial non-uniformities occur depending on the shape of the first organic resin film.

The present invention has been made on the basis of such circumstances, and it is an object thereof to provide a display device where an increase in steps is controlled and a second insulating film is uniformly applied and patterned into a predetermined shape.

A display device including a transparent conductive film and a reflective film in pixels, wherein a first insulating film and a second insulating film are laminated on source electrodes disposed on a transistor of pixel portions, concavo-convexities are formed in the first insulating film by half exposure, a reflective film is formed on the concavo-convexities between the first insulating film and the second insulating film, and a transparent conductive film is formed on the second insulating film.

Contact holes are formed for electrical connection in the first insulating film and the second insulating film disposed on connection terminals that supply signals to the pixels, and between a first angle formed by inner walls of the contact holes formed in the first insulating film and a substrate on which the connection terminals are formed and a second angle formed by inner walls of the contact holes formed in the second insulating film and the substrate, the first angle is a smaller angle than the second angle, so that when the second insulating film is applied onto the first insulating film, it is ensured that the second insulating film is applied in a uniform thickness.

The present invention realizes, in a transflective type liquid crystal display device, a display device where the occurrence of non-uniformities in the thickness of the second insulating film in the vicinities of the contact holes is reduced when the second insulating film is formed.

According to the present invention, it becomes possible to apply a second insulating film in a uniform film thickness on a first insulating film and form an insulating film with few non-uniformities in a display device disposed with reflective regions and transmissive regions.

A transflective type display device including reflective regions and transmissive regions in pixel portions, wherein source electrodes are formed on a transistor of the pixel portions, an organic resin is applied onto the source electrodes to form a first insulating film, concavo-convexities are formed in the first insulating film using half exposure, reflective electrodes are formed on the concavo-convexities, and an organic resin is applied onto the reflective electrodes to form a second insulating film.

At a connection terminal portion that electrically connects a drive circuit that supplies signals to the pixel portions, contact holes are formed on connection terminals when forming the first insulating film and the second insulating film. When forming first contact holes, half exposure is used to make the inclination of inner surfaces of the contact holes a gentle angle.

That is, the angle of the inner surfaces of the contact holes formed in the first insulating film with respect to the substrate on which the connection terminals are disposed is a smaller angle with respect to the angle of the inner surfaces formed in the second insulating film. When the angle of the first insulating film is small, the second insulating film does not suddenly move along the inner surfaces of the contact holes, and the film thickness of the second insulating film can be formed uniformly in the vicinities of the contact holes.

DETAILED DESCRIPTION OF THE INVENTION

Figure 1:
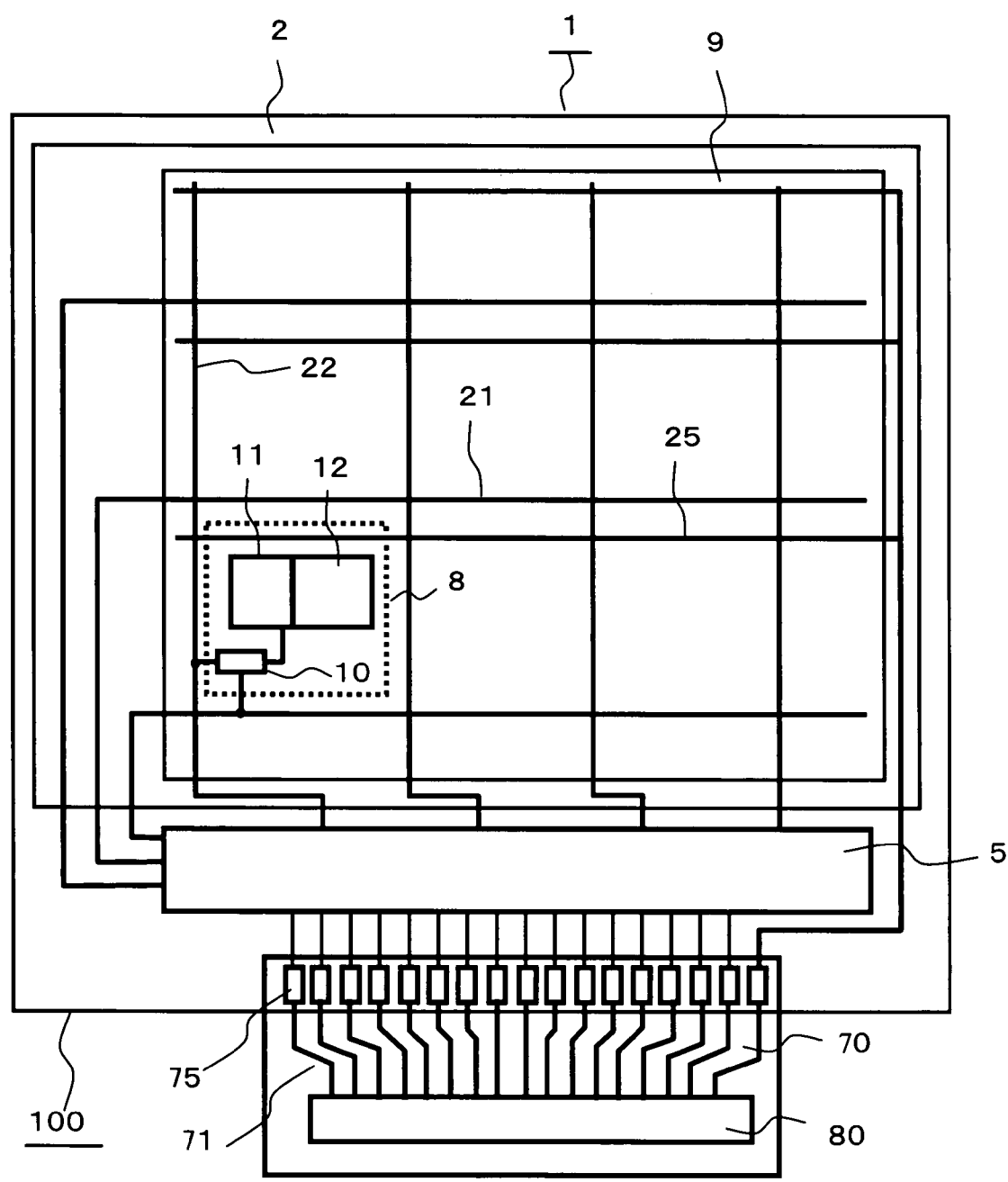
FIG. 1 is a plan schematic diagram showing the configuration of a liquid crystal display device that is an embodiment of the present invention.

FIG. 1 is a plan schematic diagram showing a liquid crystal display device 100 according to the present invention. The liquid crystal display device 100 is configured by a liquid crystal panel 1 and a control circuit 80. Signals needed for the display of the liquid crystal panel 1 are supplied from the control circuit 80. The control circuit 80 is mounted on a flexible substrate 70, and the signals are transmitted to the liquid crystal panel 1 via wires 71 and terminals 75.

A reflective region 11 and a transmissive region 12 are disposed in each pixel portion 8 of the liquid crystal panel 1. It will be noted that although the liquid crystal panel 1 is disposed with a large number of the pixel portions 8 in a matrix, just one pixel portion 8 is shown in FIG. 1 in order to facilitate understanding. The pixel portions 8 arranged in a matrix form a display region 9, with each of the pixel portions 8 fulfilling the role of a pixel of an image, and display an image in the display region 9.

In FIG. 1, the liquid crystal panel 1 is disposed with gate signal lines (also called scan lines) 21 that extend in the x direction in the drawing and are disposed adjacent to each other in the y direction and drain signal lines (also called video signal lines) 22 that extend in the y direction and are disposed adjacent to each other in the x direction. The pixel portions 8 are formed in regions surrounded by the gate signal lines 21 and the drain signal lines 22. Further, common signal lines 25 are disposed parallel to the gate signal lines 21 and supply a voltage to be applied to opposing electrodes of the pixel portions 8.

Switching elements 10 are disposed in the pixel portions 8. Control signals are supplied from the gate signal lines 21 and the switching ON and OFF of the switching elements 10 is controlled. When the switching elements 10 are switched ON, video signals transmitted via the drain signal lines 22 are supplied to the reflective regions 11 and the transmissive regions 12.

The gate signal lines 21 and the drain signal lines 22 are connected to a drive circuit 5, and the control signals and the video signals are outputted from the drive circuit 5. It will be noted that the gate signal lines 21 and the drain signal lines 22 are formed on a same TFT substrate 2, and the drive circuit 5 is mounted on the TFT substrate 2.

Figure 2:
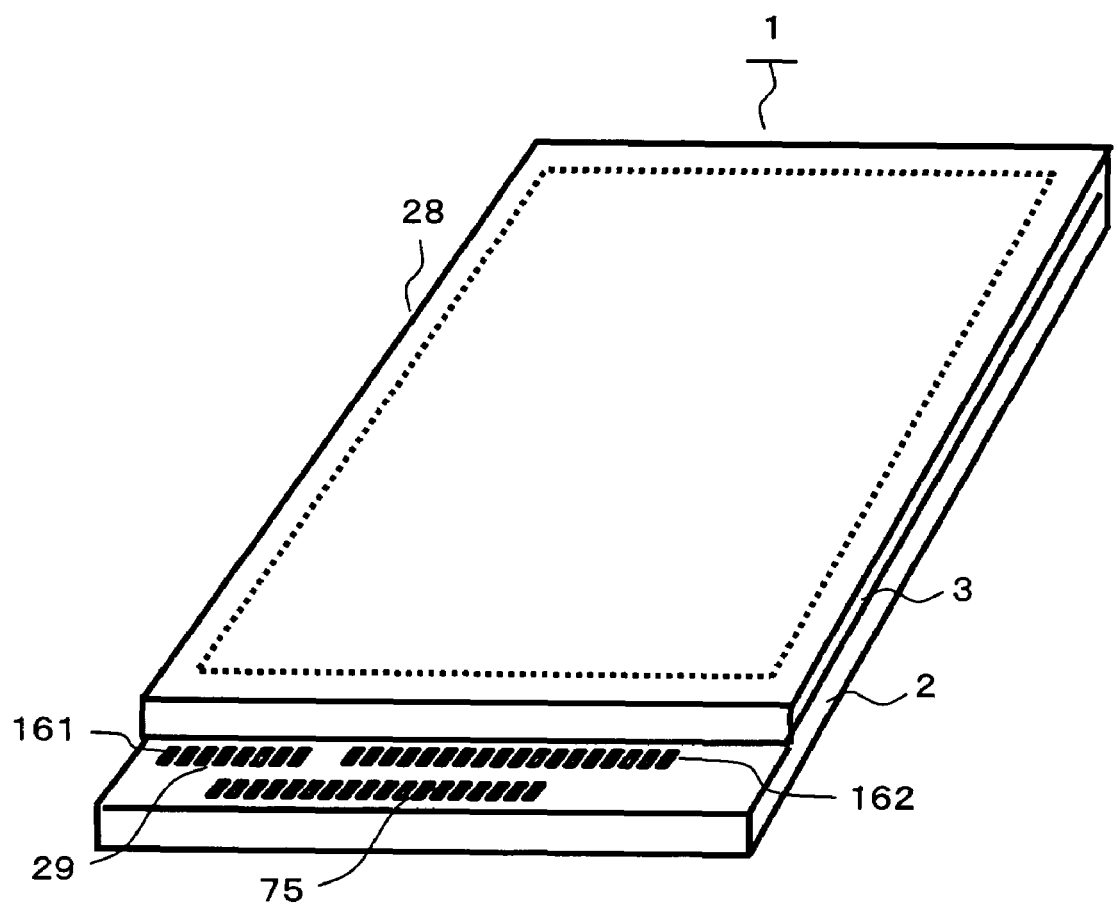
FIG. 2 is a schematic perspective diagram showing a liquid crystal panel of the liquid crystal display device that is an embodiment of the present invention.

FIG. 2 is a perspective diagram showing the liquid crystal panel 1 of the liquid crystal display device 100 according to the present invention. The liquid crystal panel 1 is configured by the TFT substrate 2, on which the aforementioned pixel portions 8 are disposed, and an opposing substrate 3 superposed on the TFT substrate 2. The TFT substrate 2 and the opposing substrate 3 have a shape where their end surfaces are aligned at three sides 28 and, at the remaining one side, the TFT substrate 2 projects further outward than the opposing substrate 3 to form a terminal connection portion 29. Gate connection terminals 161, drain connection terminals 162, and FPC connection terminals 75 are disposed on the terminal connection portion 29. The drive circuit 5 is connected to the connection terminals 161 and 162, and the flexible substrate 70 is connected to the connection terminals 75.

Figure 3:
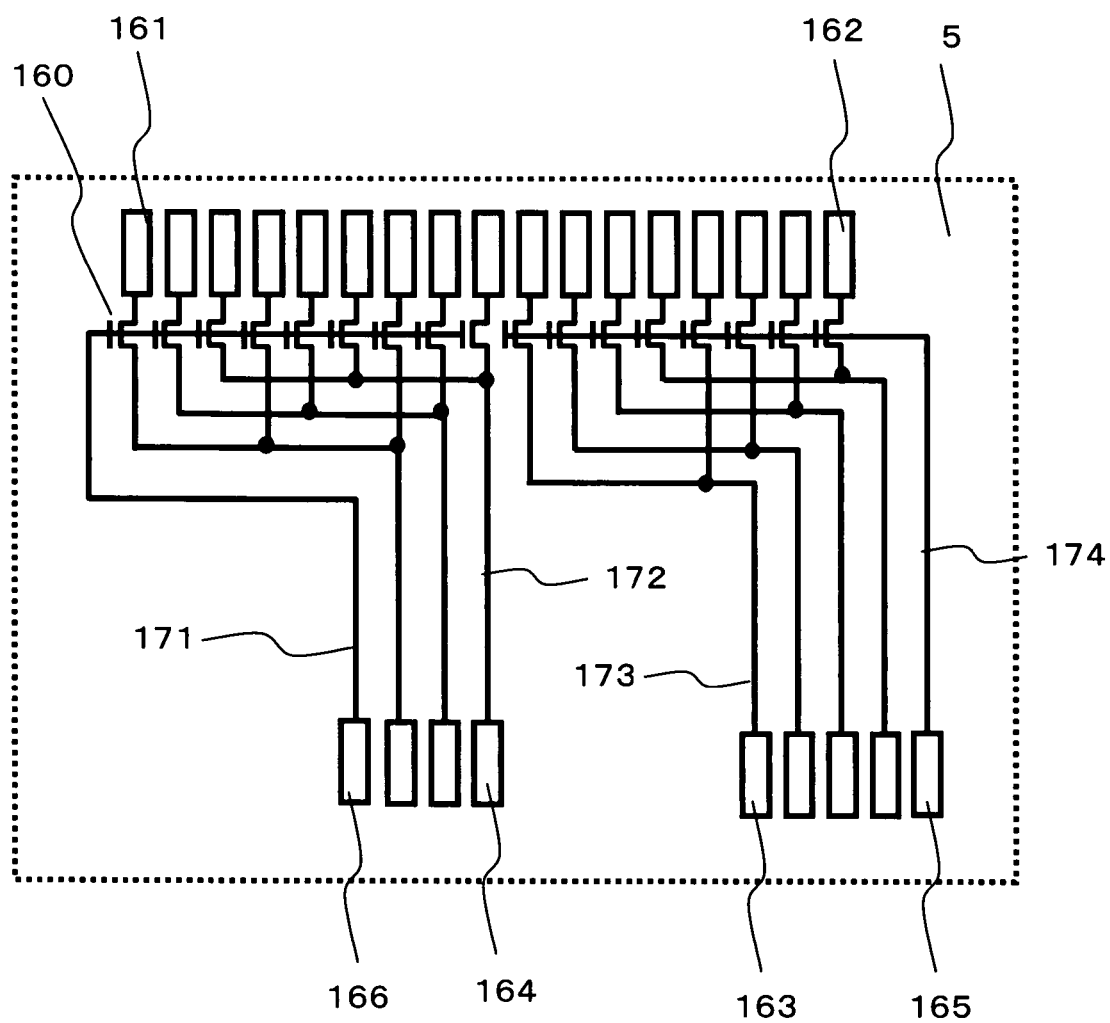
FIG. 3 is a schematic plan diagram showing a connection terminal portion of the liquid crystal display device that is an embodiment of the present invention.

Next, FIG. 3 shows a general plan diagram of the mounting portion of the drive circuit 5. The mounting portion is disposed on the terminal connection portion 29 of the liquid crystal panel 1, and a metal layer and the like that form terminals are formed by the same process as a metal layer of the pixel portions.

An inspection transistor 160 is disposed on the terminal portion. Because the liquid crystal panel 1, which is used in portable devices, is compact, the terminals are also extremely narrow. For that reason, in order to supply inspection signals one time from the terminals, it is necessary to arrange numerous extremely small probes in parallel and precisely allow these to contact inspection terminals, which has resulted in increasing the cost of inspection.

As shown in FIG. 3, when the inspection transistor 160 is used, signals are supplied from a small number of inspection terminals 163 to 166, whereby it becomes possible to supply inspection signals to numerous signal lines, and it becomes possible to simplify inspection.

The connection terminals 161 are the aforementioned gate connection terminals, and reference numeral 162 represents the drain connection terminals. A conductive film that is the same as the source/drain terminals of a pixel transistor 10 is used for the conductive film that forms the connection terminals 161 and 162 because it is connected to the source terminals of the inspection transistor 160 together with each connection terminal.

When an ON signal is supplied via wires 171 to the inspection terminals 166, an inspection signal is supplied from the inspection terminals 164 to the gate connection terminals 161 via wires 172. The gate connection terminals 161 are connected to gate electrodes of the pixel regions to enable the inspection signals to be supplied to the gate electrodes of the pixel portions using the inspection transistor 160.

Further, when an ON signal is supplied to the inspection transistor 160 via wires 174 from the inspection terminals 165, the inspection signals are supplied from the inspection terminals 163 to the drain connection terminals 162 via wires 173. The drain connection terminals 162 are connected to the drain electrodes of the pixel regions to enable the inspection signals to be supplied to the drain electrodes of the pixel portions using the inspection transistor 160.

Figure 4:
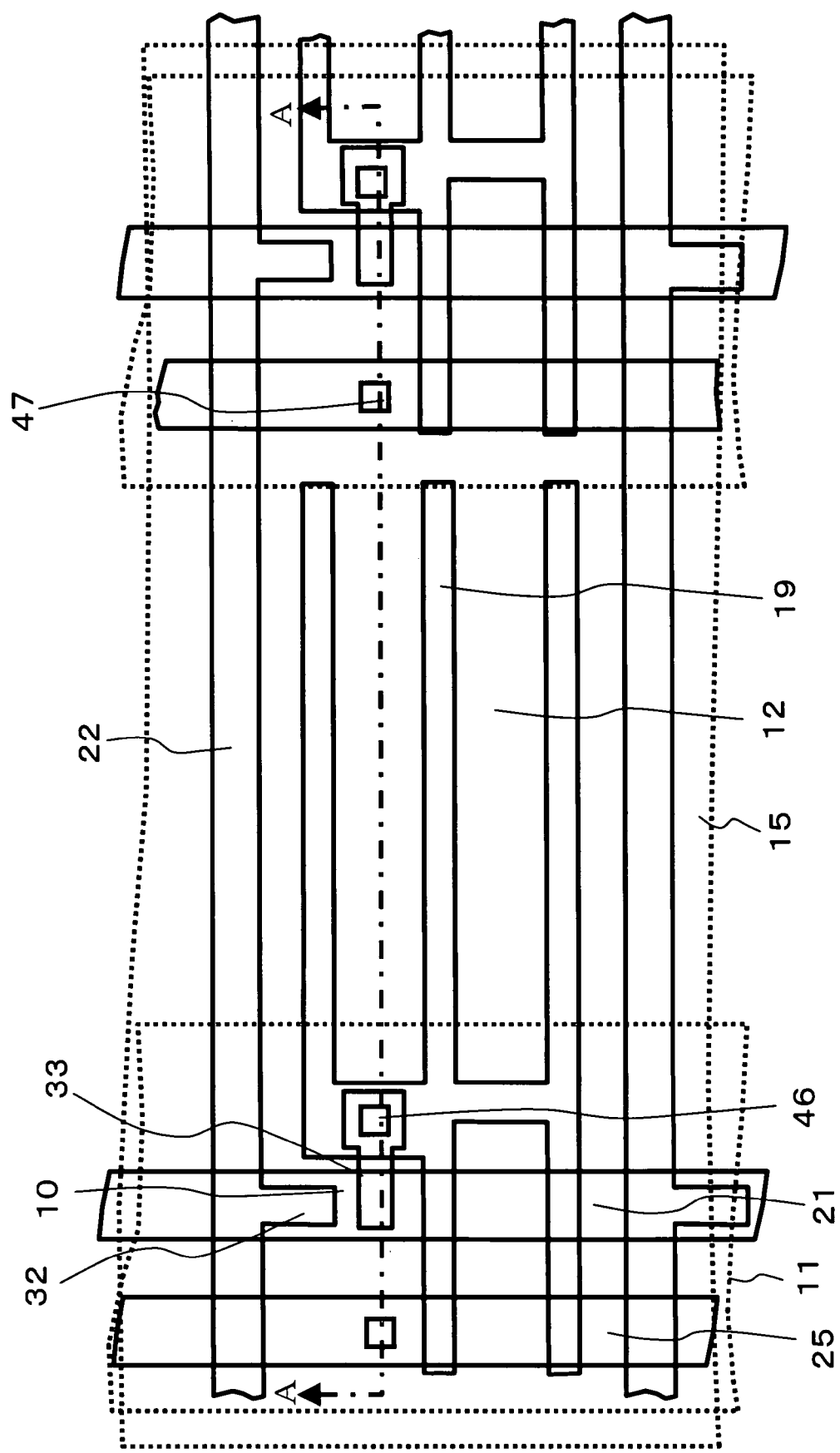
FIG. 4 is a schematic plan diagram showing a pixel portion of the liquid crystal display device that is an embodiment of the present invention.
Figure 5:
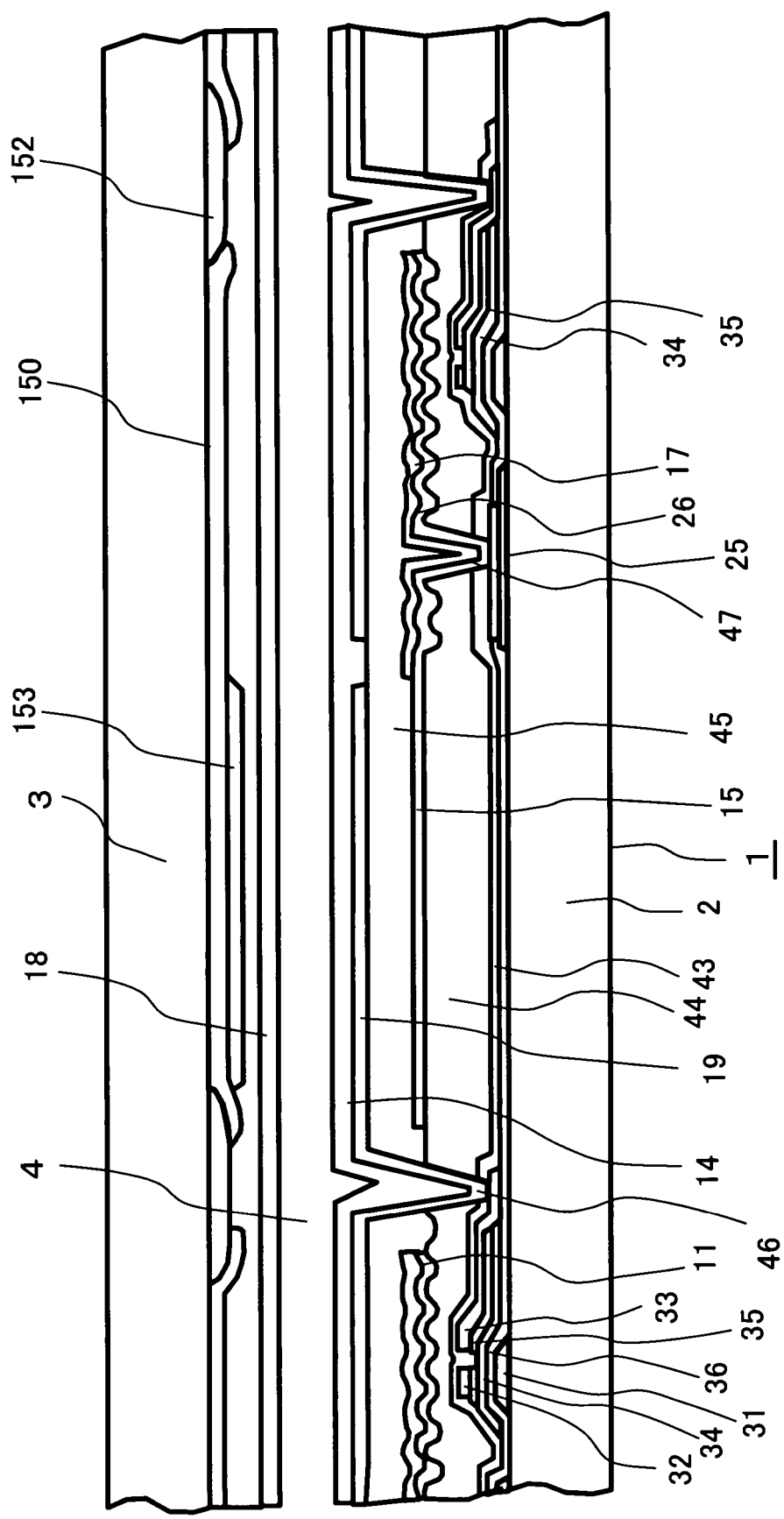
FIG. 5 is a schematic cross-sectional diagram showing the pixel portion of the liquid crystal display device that is an embodiment of the present invention.

Next, FIG. 4 shows a plan diagram of the pixel portion 8. Further, FIG. 5 shows a cross-sectional diagram indicated by line A-A in FIG. 4. FIG. 4 and FIG. 5 show a pixel portion 8 of an IPS type liquid crystal panel. An opposing electrode 15 is formed on the underside of the pixel electrode together with the reflective region 11 and the transmissive region 12.

As shown in FIG. 4, the gate signal lines 21 and the opposing electrode lines 25 are formed in parallel, and the reflective region 11 crosses the gate signal lines 21 and overlaps the opposing electrode lines 25. Further, end portions of the reflective region 11 are parallel to the gate signal lines 21 and the drain signal lines 22.

The reflective region 11 forms a reflective electrode by a metal such as aluminium on the opposing electrode 15 and reflects incident light to display an image. The metal such as aluminium used for the reflective region 11 usually does not transmit light, so the reflective region 11 has the function of a light blocking film with respect to the transmissive region 12. It will be noted that the reflective region 11 is indicated by a dotted line in FIG. 4 in order to make the configuration of the pixel portion 8 easier to understand.

The switching elements (hereinafter also called a thin film transistor, or TFT) 10 are formed in the vicinities of the areas where the gate signal lines 21 and the drain signal lines 22 intersect. The switching elements 10 are switched ON by gate signals supplied via the gate signal lines 21 so that the areas between drain electrodes 32 and source electrodes 33 become electrically conductive. When the areas between the drain electrodes 32 and the source electrodes 33 become electrically conductive, the video signals supplied from the drain signal lines 22 are written in the pixel electrodes 19 via through holes 46.

Next, FIG. 5 will be used to describe a cross-sectional diagram of the liquid crystal panel 1. The TFT substrate 2 and the color filter substrate 3 are disposed facing each other to configure the liquid crystal panel 1. A liquid crystal composition 4 is held between the TFT substrate 2 and the color filter substrate 3. It will be noted that a seal material (not shown) is disposed on the peripheral portion around the TFT substrate 2 and the color filter substrate 3. The TFT substrate 2, the color filter substrate 3 and the seal material form a vessel including a narrow clearance, and the liquid crystal composition 4 is sealed between the TFT substrate 2 and the color filter substrate 3.

Color filters 150 are formed for red (R), green (G) and blue (B) on the color filter substrate 3. A black matrix 152 is formed in the boundaries between the color filters 150 in order to block light. An orientation film 18 is disposed on the liquid crystal side of the color filter substrate 3. Further, a retardation layer 153 is disposed on the color filter substrate 3 to adjust/reduce retardations that arise between the transmissive region and the reflective region.

By disposing the retardation layer 153, there is no longer the need to make the thickness of the liquid crystal layer of the reflective region half that of the transmissive region, so the pixel electrodes 19 can be formed in substantially the same plane as both the reflective region and the transmissive region.

At least part of the TFT substrate 2 is formed from transparent glass or resin. As mentioned previously, the gate signal lines 21 are formed on the TFT substrate 2. The gate signal lines 21 are formed from a multilayer film comprising a film whose main component is chrome (Cr) or zirconium (Zr) and a film whose main component is aluminium (Al). Further, the side surfaces of the gate signal lines 21 slant such that its linear width expands from the upper surface to the undersurface on the TFT substrate side. Part of the gate signal lines 21 form gate electrodes 31. A gate insulating film 36 is formed so as to cover the gate electrodes 31, and a semiconductor layer 34 comprising an amorphous silicon film is formed on the gate insulating film 36. Impurities are added to the upper portion of the semiconductor layer 34 such that an n+ layer 35 is formed. The n+ layer 35 is an ohmic contact layer and is formed such that the semiconductor layer 34 is excellently electrically connected. Drain electrodes 32 and source electrodes 33 are formed apart from each other on the semiconductor n+ layer 35. It will be noted that called name of the drains and sources may be changing depending on their electric potential, but in the present specification those which connect to the drain signal lines 22 are called drains.

The drain signal lines 22, the drain electrodes 32 and the source electrodes 33 are formed from a multilayer film comprising two layers whose main component is an alloy of molybdenum (Mo) and chrome (Cr) or molybdenum (Mo) or tungsten (W), with a layer whose main component is aluminium being interposed therebetween. An inorganic insulating film 43 and a first organic insulating film 44 are formed on a TFT 30 and cover the drain signal lines 22, the drain electrodes 32 and the source electrodes 33. The source electrodes 33 are connected to the pixel electrodes 19 via through holes 46 formed in the inorganic insulating film 43 and the first organic insulating film 44.

It will be noted that it is possible to form the inorganic insulating film 43 using silicon nitride or silicon oxide, an organic resin film can be used for the first organic insulating film 44, and it is possible to form the surface thereof to be comparatively flat, but it is also possible to work the surface to form concavo-convexities by half exposure or the like.

The reflective region 11 is formed by the reflective electrode 17 disposed on the opposing electrode 15 and part of the pixel electrode 19. The reflective electrode includes on its emission side surface a conductive film of metal whose light reflectivity is high, such as aluminium, and is formed from a multilayer film comprising a layer whose main component is tungsten or chrome and a layer whose main component is aluminium.

Further, in the transmissive region 12, the opposing electrode 15 is configured by a transparent conductive film without being covered by the reflective electrode 17. It will be noted that the transparent conductive film that forms the pixel electrodes 19 and the opposing electrodes 15 is configured from a light transmitting conductive layer such as indium tin oxide (ITO), indium tin zinc oxide (ITZO), indium zinc oxide (IZO), zinc oxide (ZnO), tin oxide (SnO), and indium oxide ($In_2O_3$).

Further, the layer whose main component is chrome may comprise just chrome or an alloy of chrome and molybdenum (Mo), the layer whose main component is zirconium may comprise just zirconium or an alloy of zirconium and molybdenum, the layer whose main component is tungsten may comprise just tungsten or an alloy of tungsten and molybdenum, and the layer whose main component is aluminium may comprise just aluminium or an alloy of aluminium and neodymium (Nd) or silicon.

Convexo-concavities are formed in the upper surface of the first organic insulating film 44 by changing the light exposure amount by position using the photolithographic method. For that reason, the reflective electrodes 17 formed on the first organic insulating film 44 also include concavo-convexities. Because concavo-convexities are disposed in the reflective electrodes 17, the percentage by which the reflected light is scattered increases.

A second organic insulating film 45 is disposed as an interlayer film between the reflective electrodes 17 and the opposing electrodes 15 and the pixel electrodes 19. The reflective electrodes 17 include concavo-convexities as mentioned previously, but when an interlayer film is formed by the second organic insulating film 45, it becomes possible to planarize the concavo-convexities. For that reason, the pixel electrodes 19 formed on the reflective electrodes 17 can be formed flatly. It will be noted that the opposing electrodes 15 are connected to the opposing electrode lines 25 via through holes 47.

The opposing electrodes 15 and the pixel electrodes 19 are made by a transparent conductive film. The second organic insulating film 45 disposed between the opposing electrodes 15 and the pixel electrodes 19. Then the storage capacitor comprised the second organic insulating film 45, the opposing electrodes 15 and the pixel electrodes 19.

This storage capacitor has transparent electrodes, hence the transmittance ratio of the pixel is not reduced by the storage capacitor.

Figure 6A:
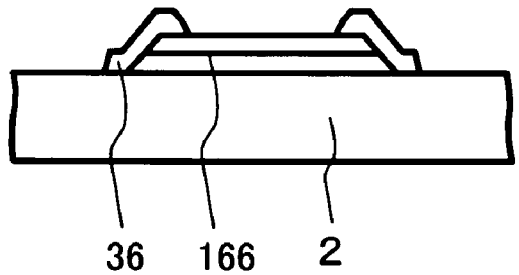
FIGS. 6A and 6B are schematic cross-sectional diagrams showing steps in manufacturing terminal portions of the liquid crystal display device that is an embodiment of the present invention.
Figure 6B:
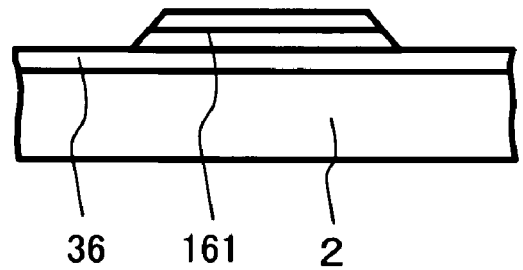

Next, the connection terminal portion will be described using FIGS. 6A and 6B to FIGS. 16A and 16B. FIG. 6A shows the inspection connecting terminal 166 comprising the same layer as the gate signal lines 21, and FIG. 6B shows the gate connection terminal 161 comprising the same layer as the drain signal lines 22. In each of FIGS. 6 to 13, "A" shows the inspection connecting terminal 166 and "B" shows the gate connection terminal 161.

As mentioned previously, the gate connection terminals 161 supply signals to the gate signal lines 21, but they are formed from the same layer as the drain signal lines 22 at their terminal portions because they are connected to the source terminals of the inspection transistor 160.

The inspection connecting terminal 166 is disposed on the underside of the gate insulating film 36, and the gate insulating film 36 on the upper surface of the inspection connecting terminal 166 is removed for electrical connection such that an opening is formed. The gate connection terminal 161 is formed on the gate insulating film 36.

Because the inspection connecting terminal 166 is formed by the same conductive layer as the gate electrode, similar to the gate signal line 21, it is formed from a multilayer film comprising a layer whose main component is chrome (Cr) or zirconium (Zr) and a layer whose main component is aluminium (Al). Further, the side surfaces of the inspection connecting terminal 166 have a tapered shape such that its linear width becomes larger from the upper surface to the undersurface on the TFT substrate side.

Figure 7A:
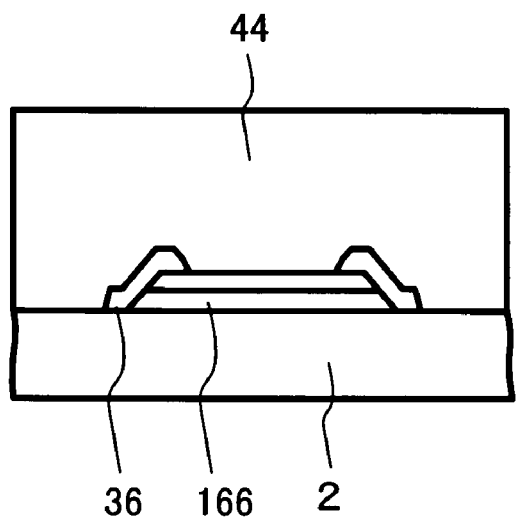
FIGS. 7A and 7B are schematic cross-sectional diagrams showing steps in manufacturing the terminal portions of the liquid crystal display device that is an embodiment of the present invention.
Figure 7B:
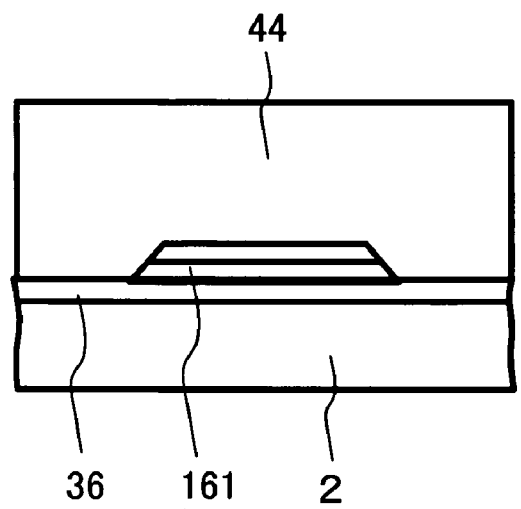

First, as shown in FIGS. 7A and 7B, the first organic resin film 44 is applied by the spin coating method or the like onto the inspection connecting terminal 166 and the gate connection terminal 161.

Figure 8A:
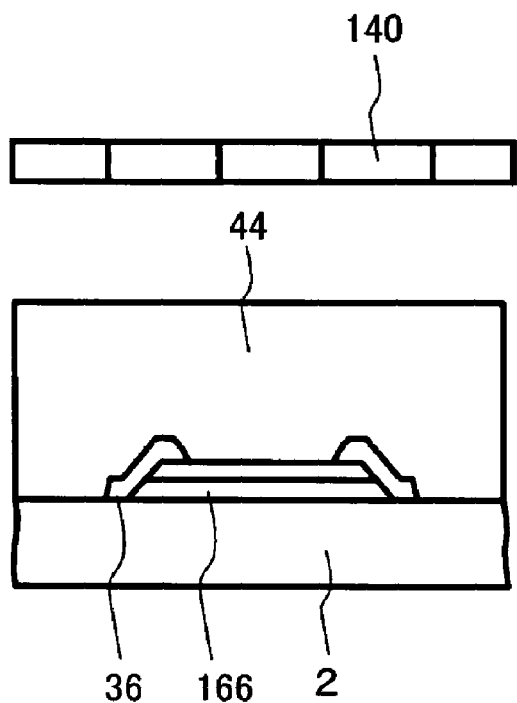
FIGS. 8A and 8B are schematic cross-sectional diagrams showing steps in manufacturing the terminal portions of the liquid crystal display device that is an embodiment of the present invention.
Figure 8B:
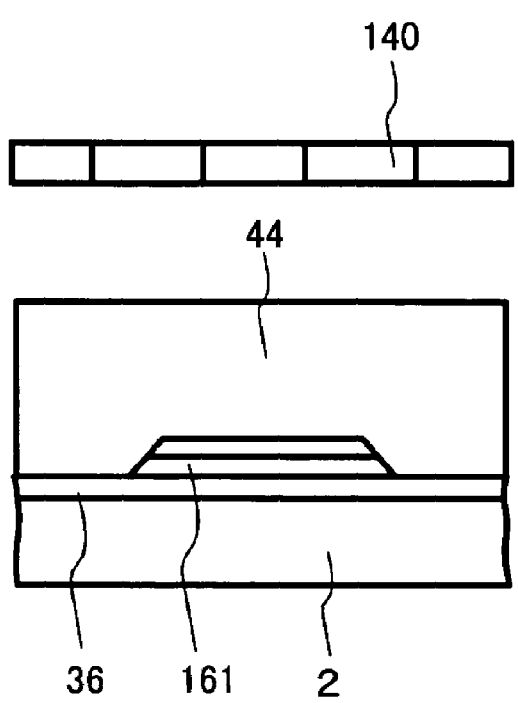

Next, as shown in FIGS. 8A and 8B, the exposing mask 140 is disposed above the first organic resin film 44, and the first organic resin film 140 is irradiated with light. A pattern is formed on the exposing mask 140 such that the light exposure amount changes depending on its position.

Figure 9A:
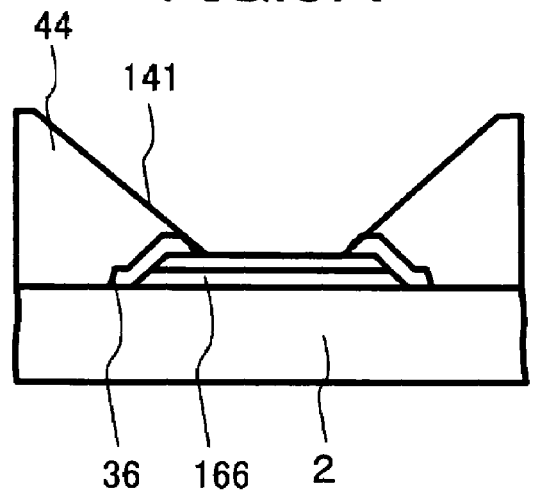
FIGS. 9A and 9B are schematic cross-sectional diagrams showing steps in manufacturing the connection terminal portions of the liquid crystal display device that is an embodiment of the present invention.
Figure 9B:
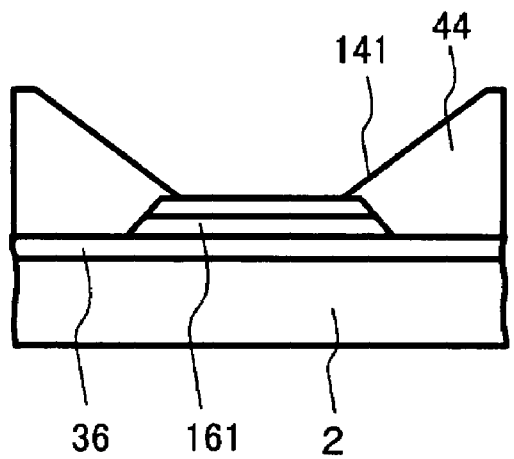

For that reason, as shown in FIGS. 9A and 9B, when the first organic resin film 44 is developed (removed) after being exposed, the amount of the first organic resin film 44 to be removed by the light exposure amount gently changes, and surfaces 141 that slant from the upper surface of the inspection connecting terminal 166 and the gate connection terminal 161 toward the peripheral sides are formed.

When the angle between the slanting surfaces 141 of the first organic resin film 44 and the TFT substrate 2 is equal to or less than 25°, realization is possible by forming a mask whose transmittance ratio changes from 70% to 30% from the upper surface of the inspection connecting terminal 166 and the gate connection terminal 161 toward the peripheral sides.

Figure 10:
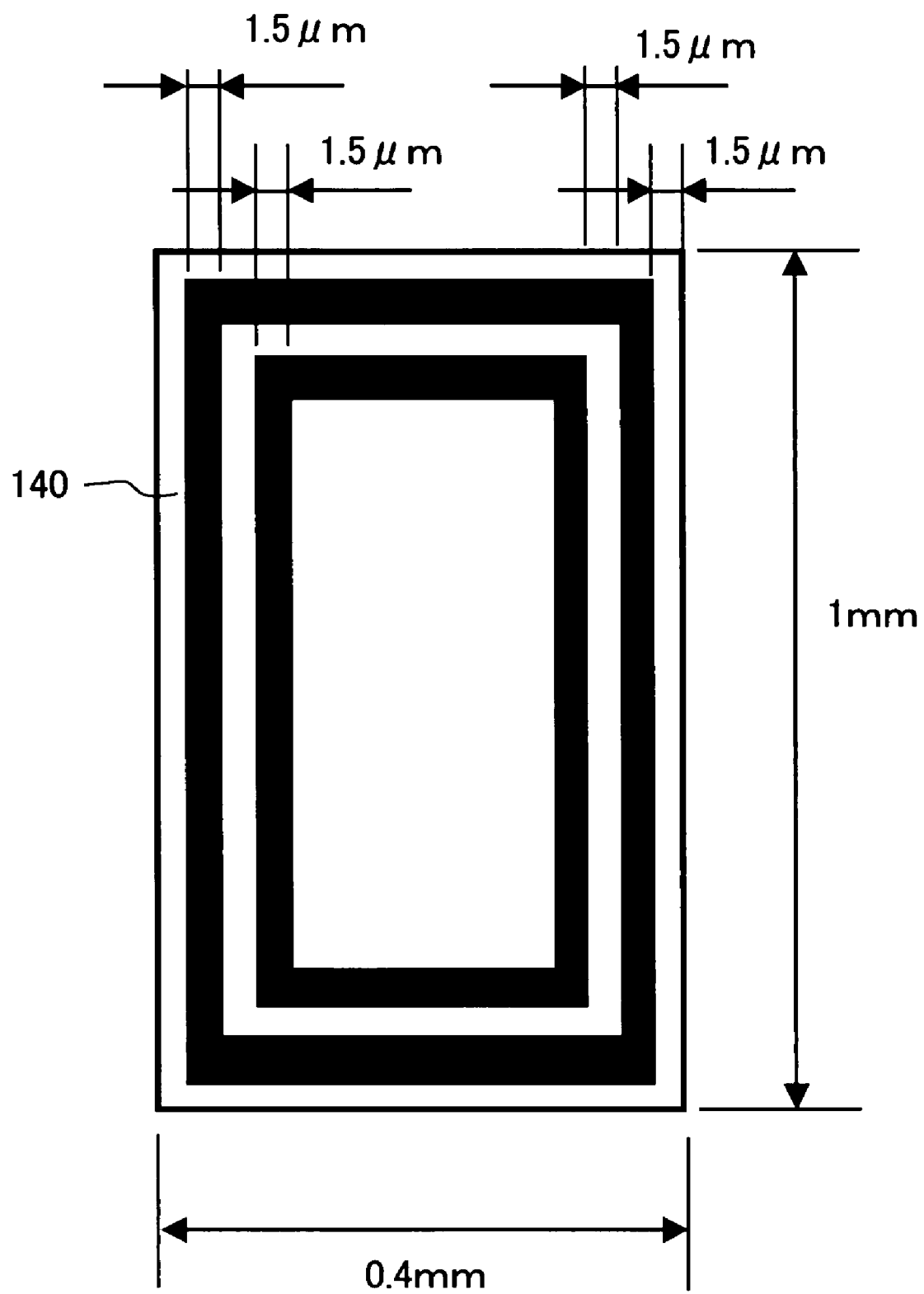
FIG. 10 is a schematic plan diagram of an exposing mask used in the manufacture of the liquid crystal display device that is an embodiment of the present invention.

For example, the mask is realizable by the mask shown in FIG. 10. FIG. 10 shows a mask when forming an opening in a 1 mm×0.4 mm frame. A line with a width of 1.5 μm is formed 1.5 μm inside the 1 mm×0.4 mm frame so as to be half-exposed. Moreover, another 1.5 μm line is formed 1.5 μm inside.

Figure 11A:
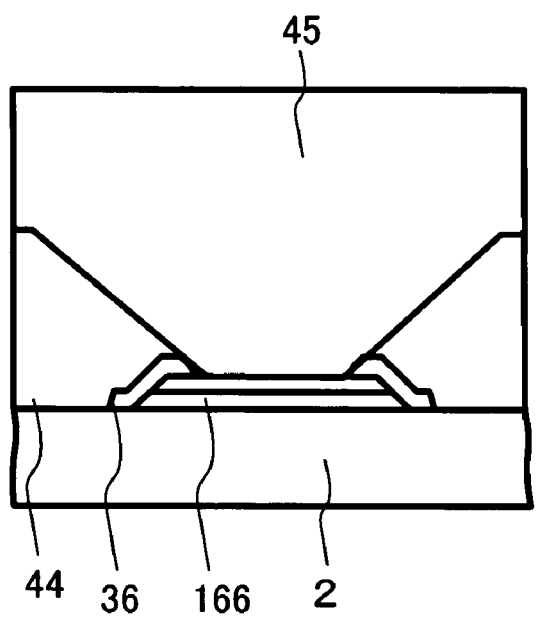
FIGS. 11A and 11B are schematic cross-sectional diagrams showing steps in manufacturing a connection terminal portion of the liquid crystal display device that is an embodiment of the present invention.
Figure 11B:
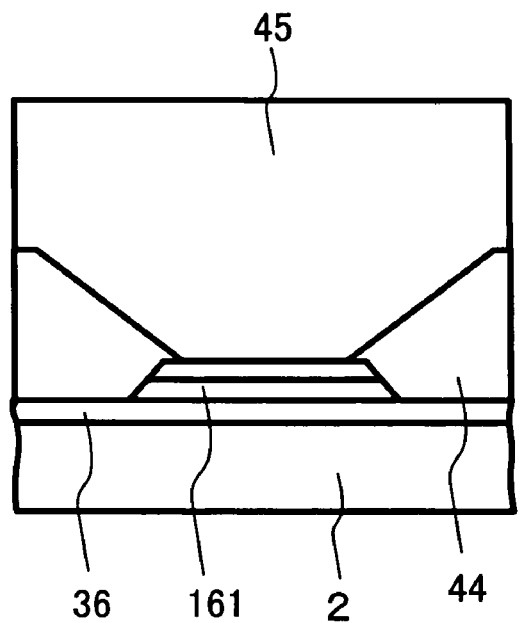

Next, as shown in FIGS. 11A and 11B, the second organic resin film 45 is applied by the spin coating method or the like on the first organic resin film 44. At this time, when the slanted surfaces 141 disposed in the first organic resin film 44 are steep, numerous radial non-uniformities occur in the second organic resin film 45 on the peripheral sides of the inspection connecting terminal 166 and the gate connection terminal 161.

This is thought to be because when the second organic resin film 45 is applied by spin coating, the second organic resin film 45 steeply runs up from the opening formed in the first organic resin film 44 and radially moves on the first organic resin film 44 because of that momentum.

Next, the occurrence of radial non-uniformities becomes remarkable when the diagonal diameter of the opening formed in the first organic resin film 44 is equal to or greater than 100 μm and the film thickness is equal to or greater than 0.5 μm. In FIGS. 11A and 11B, the angle of the slanted surfaces 141 is equal to or less than 25° with respect to the TFT substrate 2 to prevent the occurrence of radial non-uniformities.

Figure 12A:
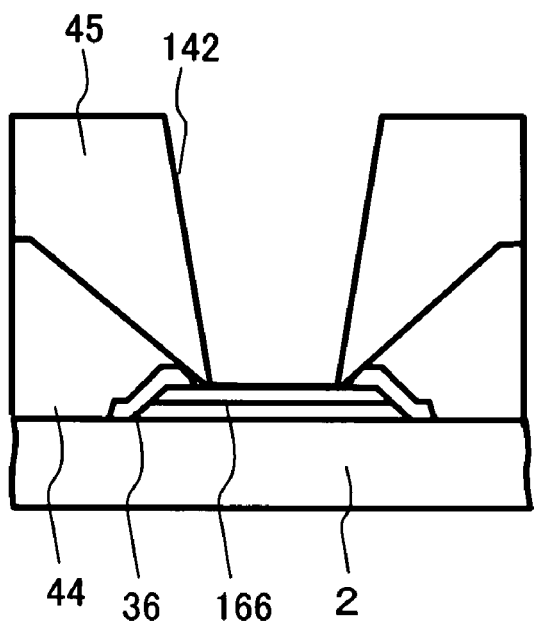
FIGS. 12A and 12B are schematic cross-sectional diagrams showing steps in manufacturing the connection terminal portion of the liquid crystal display device that is an embodiment of the present invention.
Figure 12B:
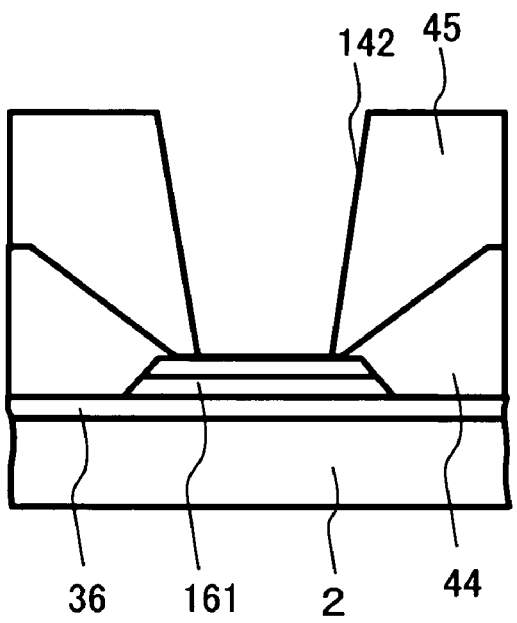

Next, as shown in FIGS. 12A and 12B, the second organic resin film 45 is also exposed/developed to form an opening including slanted surfaces 142. The slanted surfaces 142 have an angle that is greater than that of the slanted surfaces 141.

Figure 13A:
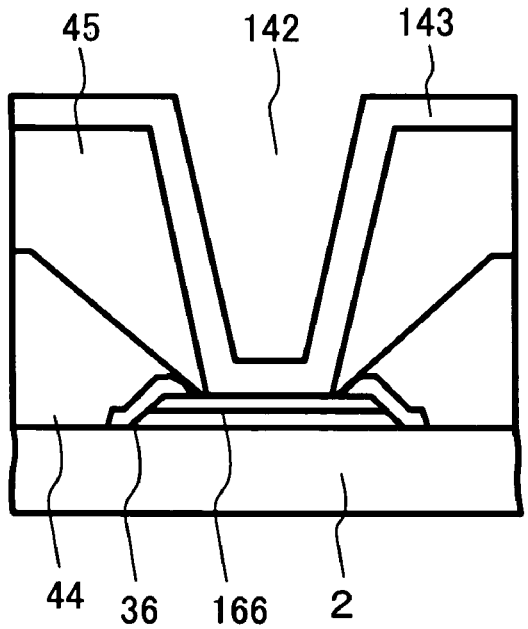
FIGS. 13A and 13B are schematic cross-sectional diagrams showing steps in manufacturing the connection terminal portion of the liquid crystal display device that is an embodiment of the present invention.
Figure 13B:
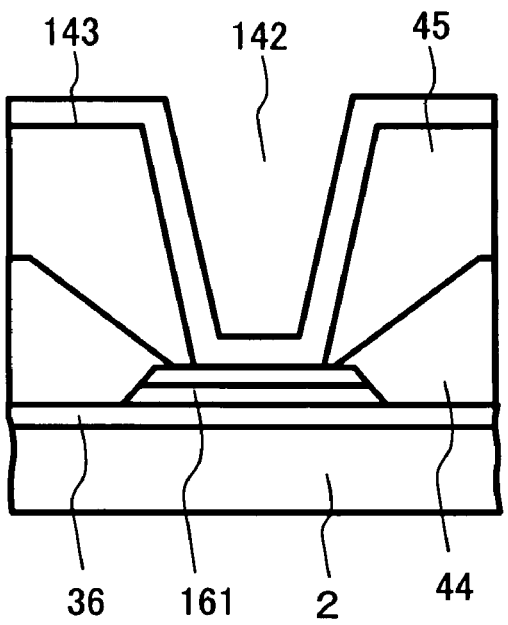
Figure 14A:
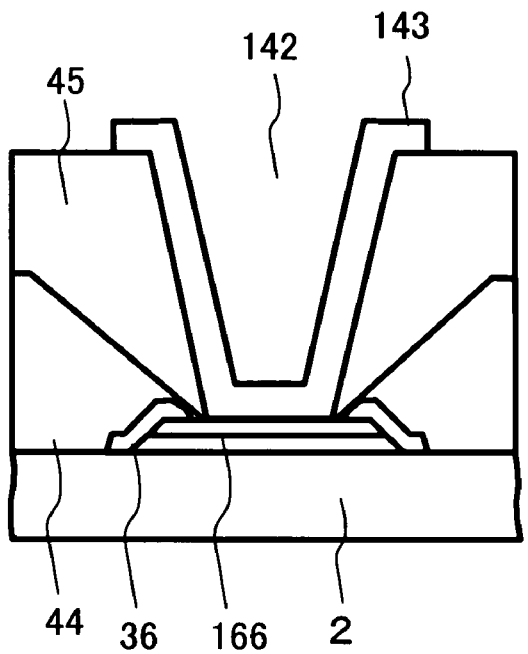
FIGS. 14A and 14B are schematic cross-sectional diagrams showing steps in manufacturing the connection terminal portion of the liquid crystal display device that is an embodiment of the present invention.
Figure 14B:
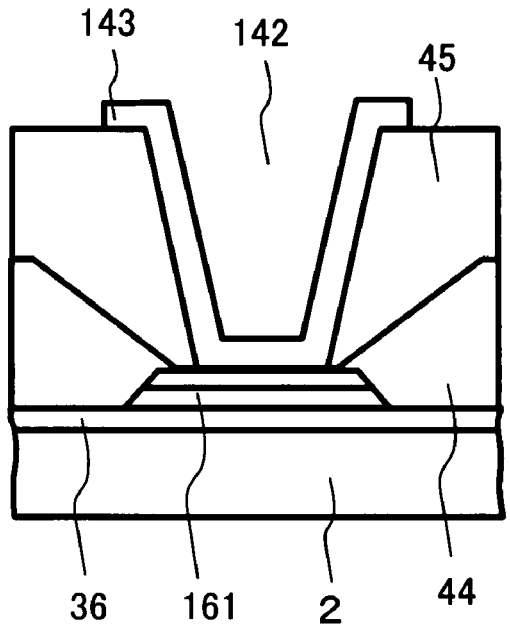

Next, as shown in FIGS. 13A and 13B, the transparent conductive film 143 is formed on the second organic resin film 45 and is patterned as shown in FIGS. 14A and 14B to form the inspection connecting terminal 166 and the gate connection terminal 161.

Figure 15A:
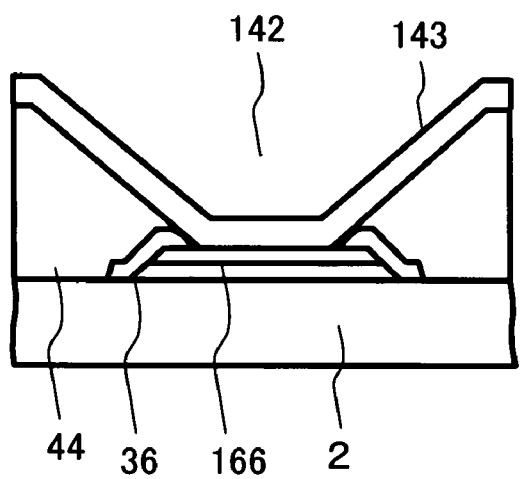
FIGS. 15A and 15B are schematic cross-sectional diagrams showing steps in manufacturing the connection terminal portion of the liquid crystal display device that is an embodiment of the present invention.
Figure 15B:
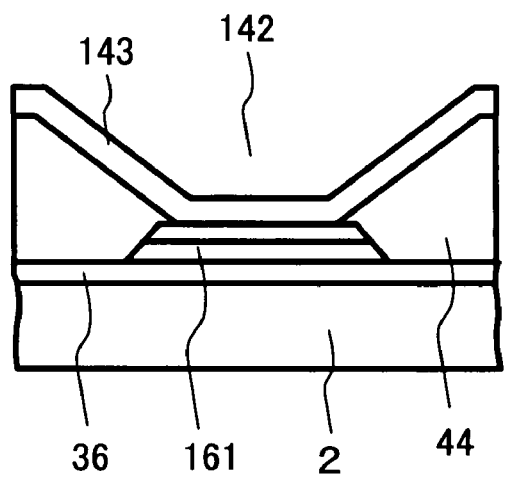

It will be noted that, as shown in FIGS. 15A and 15B, it is also possible to not apply the second organic resin film 45 on the terminal but remove it after application and form the transparent conductive film 143 on the first organic insulating film 44 show slanted surfaces are gentle.

Figure 16A:
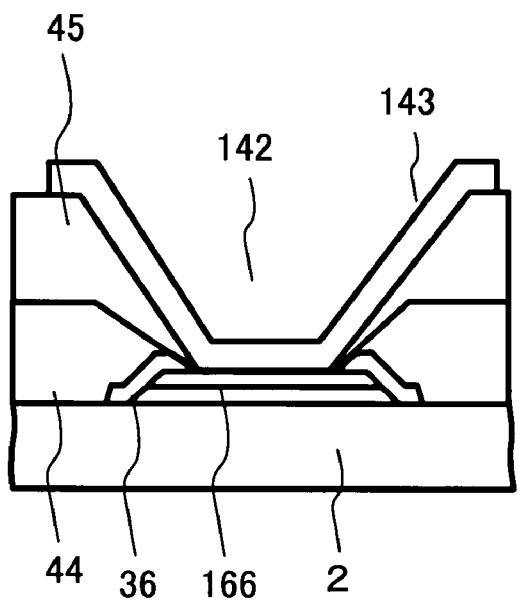
FIGS. 16A and 16B are schematic cross-sectional diagrams showing steps in manufacturing the connection terminal portion of the liquid crystal display device that is an embodiment of the present invention.
Figure 16B:
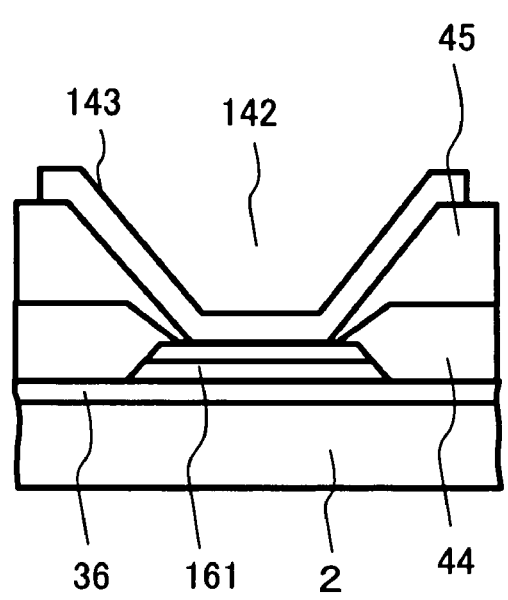
Figure 17:
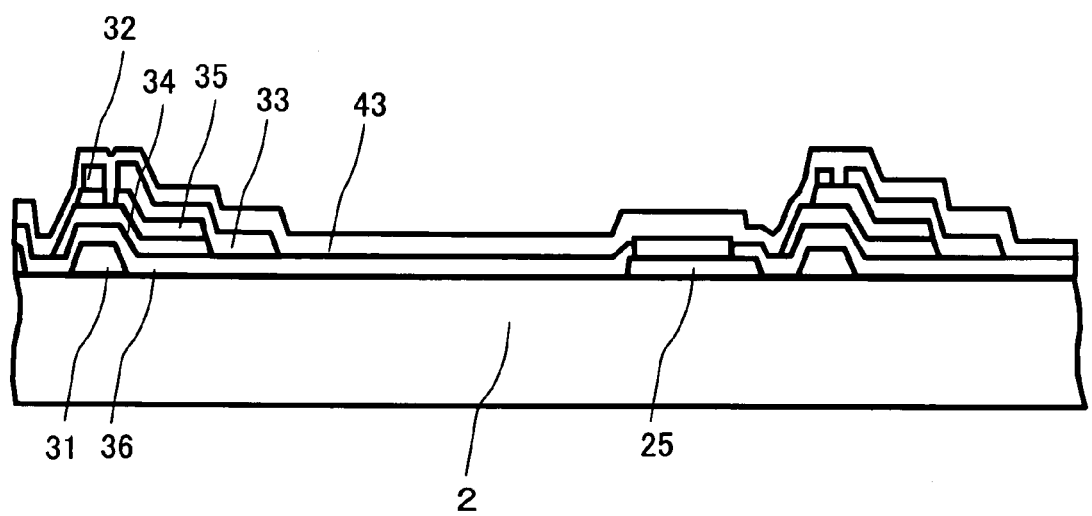
FIG. 17 is a schematic cross-sectional diagram showing a step in manufacturing the pixel portion of the liquid crystal display device that is an embodiment of the present invention.

Further, as shown in FIGS. 16A and 16B, it is also possible to give the second organic resin film 45 gentle slanted surfaces using half exposure or the like and form the transparent conductive film 143 on the first organic insulating film 44 and the second organic insulating film 45 whose slanted surfaces are gentle.

Next, steps of forming the TFT substrate 2 will be described using FIG. 17 to FIG. 26. In the step shown in FIG. 17, the gate electrode 31, the gate insulating film 36, the semiconductor layer 34, the source electrode 33, the drain electrode 32, the n+ layer 35, the storage capacitor line 25, the storage capacitor electrode 26 and the inorganic protective layer 43 are formed on the TFT substrate 2.

Figure 18:
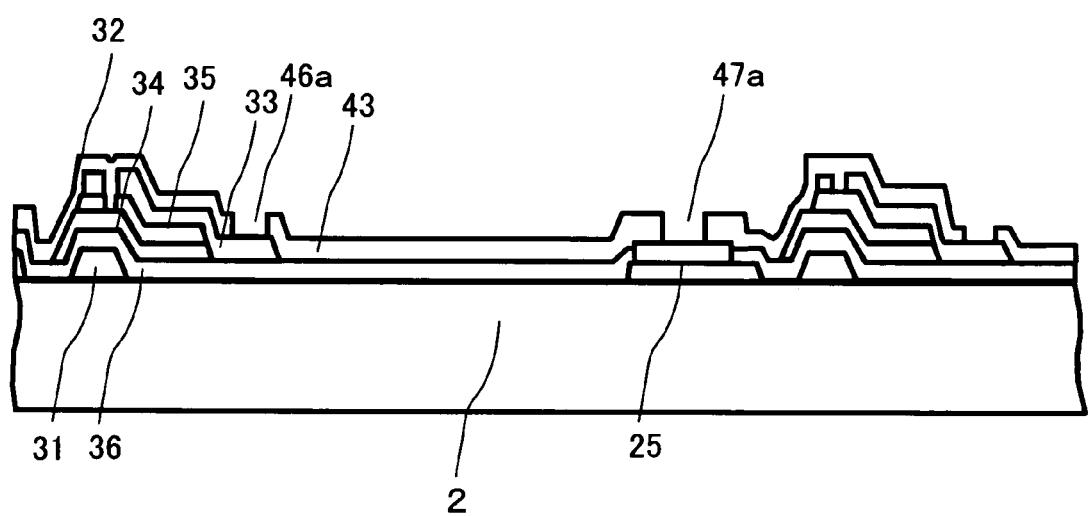
FIG. 18 is a schematic cross-sectional diagram showing a step in manufacturing the pixel portion of the liquid crystal display device that is an embodiment of the present invention.

In the step shown in FIG. 18, the inorganic protective film 43 comprising silicon nitride (SiN) and silicon oxide ($SiO_2$) is patterned by the photolithographic process to form the contact hole 46a on the source electrode 33 and the contact hole 47a on the storage capacitor line 25.

Figure 19:
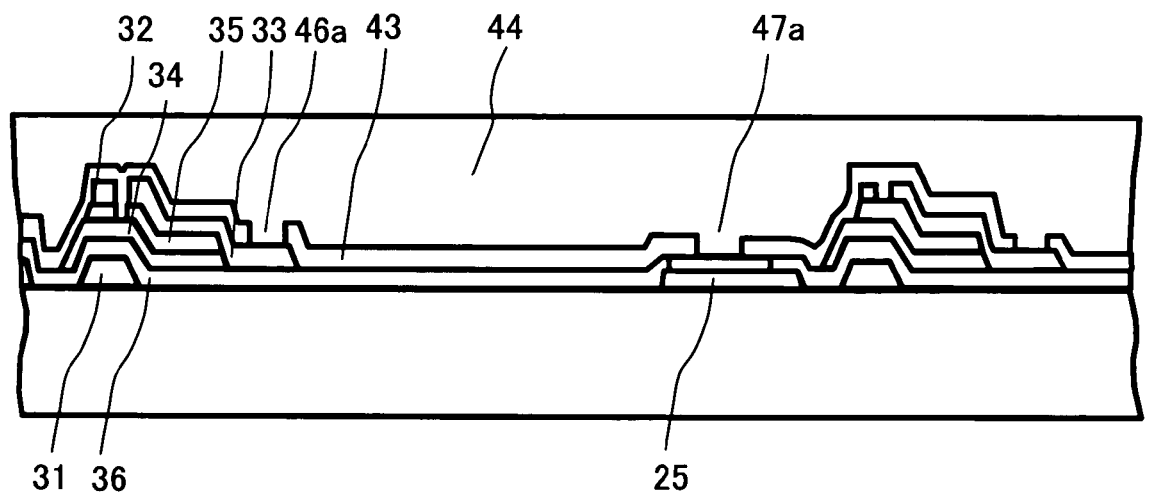
FIG. 19 is a schematic cross-sectional diagram showing a step in manufacturing the pixel portion of the liquid crystal display device that is an embodiment of the present invention.

In the step shown in FIG. 19, the first organic resin film 44 is applied by the spin coating method or the like onto the TFT substrate 2 in which the contact holes 46a and 47a have been formed.

Figure 20:
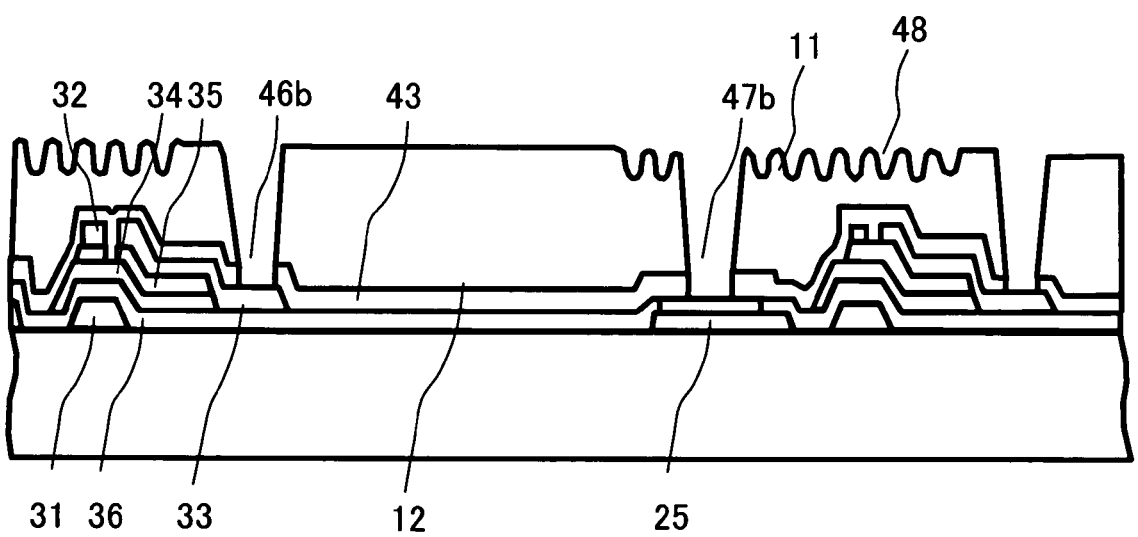
FIG. 20 is a schematic cross-sectional diagram showing a step in manufacturing the pixel portion of the liquid crystal display device that is an embodiment of the present invention.

In the step shown in FIG. 20, a contact hole 46b is formed in the first organic resin film 44 so as to be superposed on the contact hole 46a, and a contact hole 47b is formed so as to be superposed on the contact hole 47a. A photosensitive organic resin film can be used for the first organic resin film 44, and the first organic resin film 44 can be exposed using a photomask and given a predetermined pattern using a developer.

Further, in the reflective region 11, concavo-convexities 48 are formed by half exposure. By disposing a portion whose light exposure amount is large and a portion whose light exposure amount is small in the organic resin film 44 by the shape of the photomask (also called halftone exposure), when the first organic resin film 44 is a positive type, the first organic resin film 44 is easily removed by a developer at the portion whose light exposure amount is large and concave portions are formed.

Figure 21:
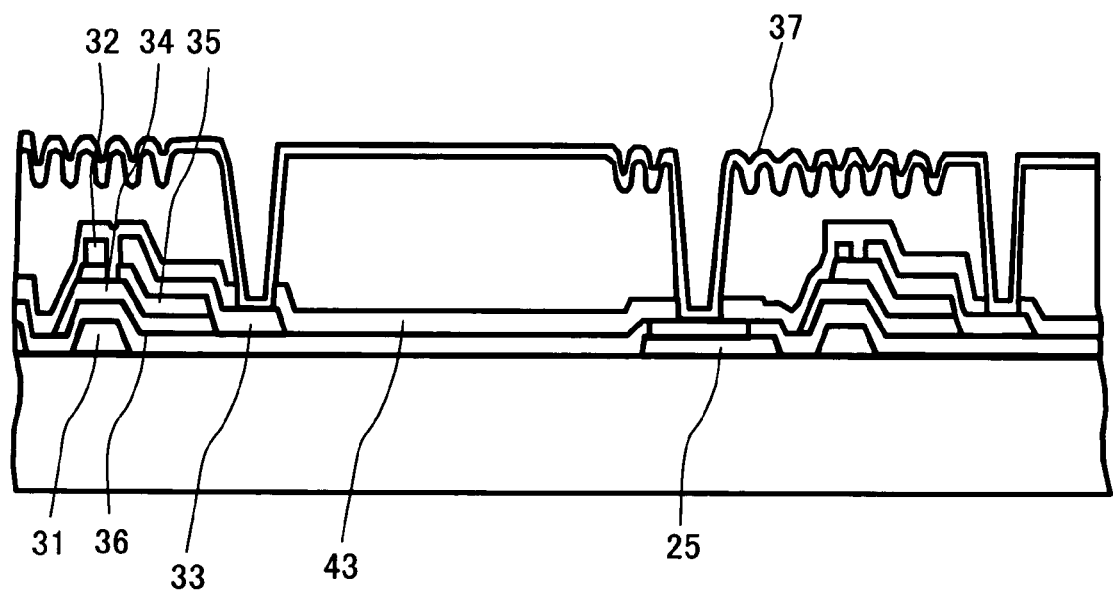
FIG. 21 is a schematic cross-sectional diagram showing a step in manufacturing the pixel portion of the liquid crystal display device that is an embodiment of the present invention.

In the step shown in FIG. 21, the first transparent conductive film 37 is formed by a method such as sputtering on the first organic resin film 44. The first transparent conductive film forms the opposing electrode 15.

Figure 22:
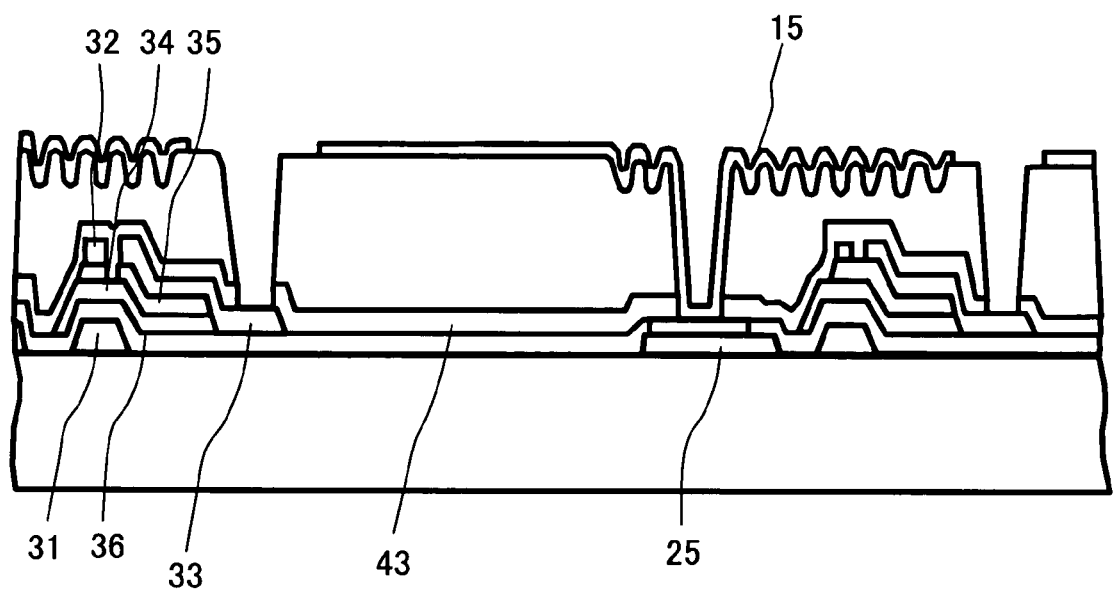
FIG. 22 is a schematic cross-sectional diagram showing a step in manufacturing the pixel portion of the liquid crystal display device that is an embodiment of the present invention.

Next, in the step shown in FIG. 22, the first transparent conductive film 37 is patterned by the photolithography method to form the opposing electrode 15.

Figure 23:
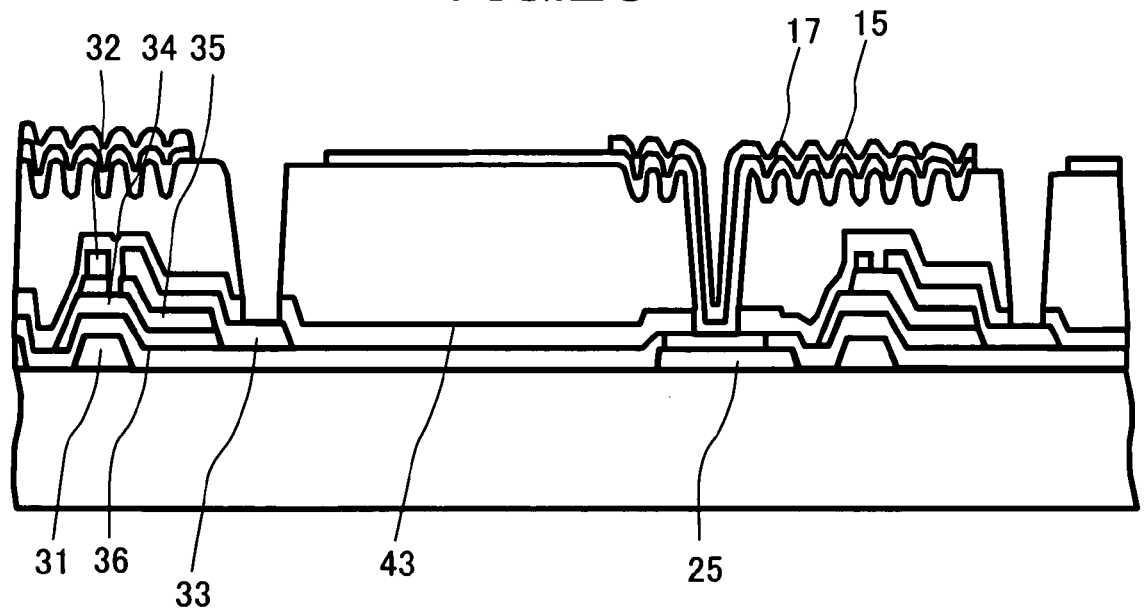
FIG. 23 is a schematic cross-sectional diagram showing a step in manufacturing the pixel portion of the liquid crystal display device that is an embodiment of the present invention.

In the step shown in FIG. 23, a metal layer that forms the reflective electrode 17 is formed on the opposing electrode 15 and is thereafter by the photolithography method to form the reflective electrode 17.

Figure 24:
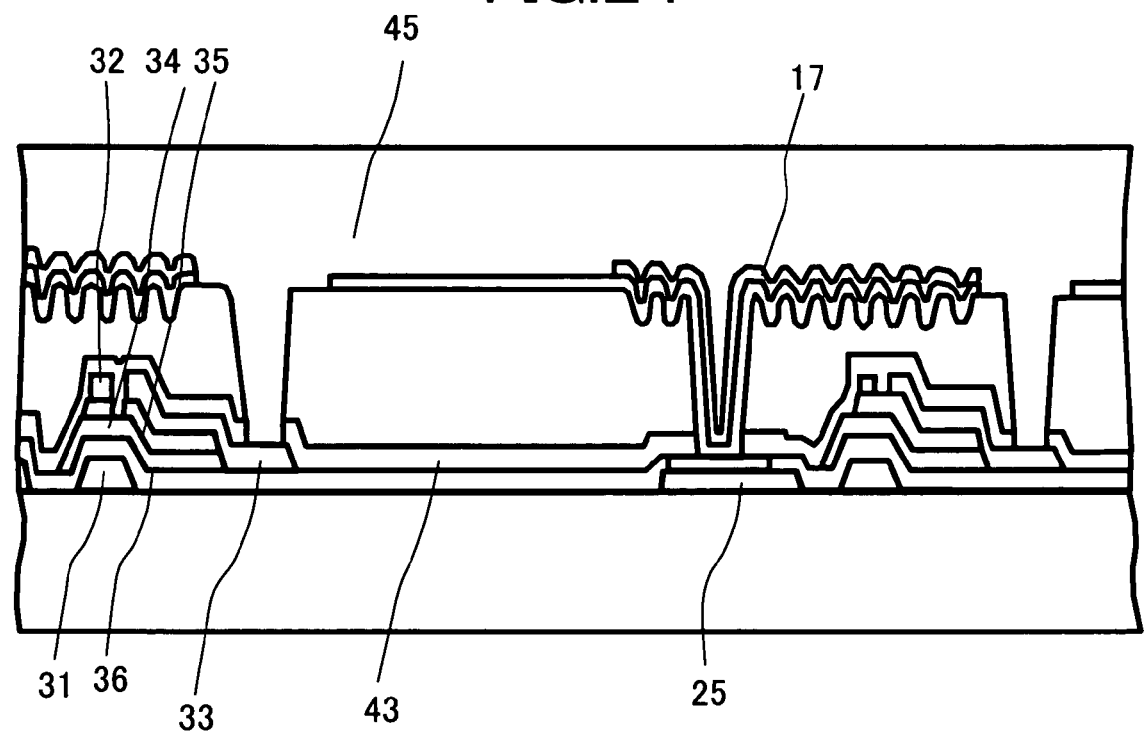
FIG. 24 is a schematic cross-sectional diagram showing a step in manufacturing the pixel portion of the liquid crystal display device that is an embodiment of the present invention.

Next, in the step shown in FIG. 24, the second organic resin film 45 is applied by the spin coating method onto the opposing electrode 15 and the reflective electrode 17. At this time, the inclination of the opening in the connection terminal portion is made gentle, whereby it becomes possible to control the occurrence of radial non-uniformities in the connection terminal portion.

Figure 25:
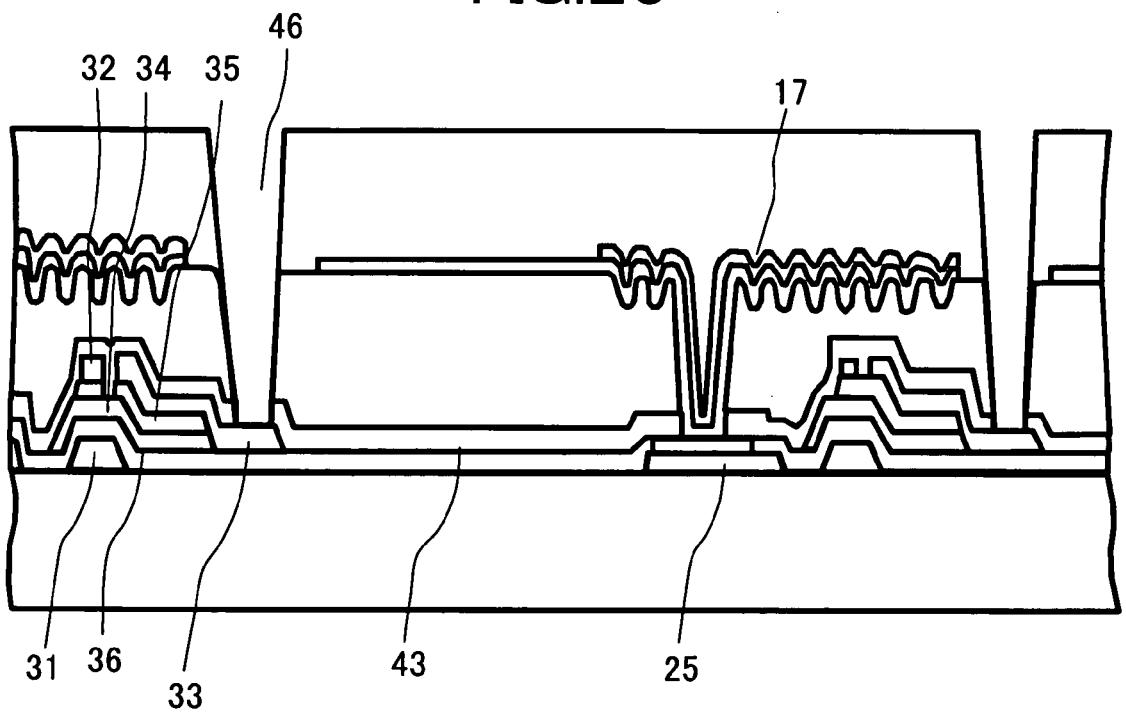
FIG. 25 is a schematic cross-sectional diagram showing a step in manufacturing the pixel portion of the liquid crystal display device that is an embodiment of the present invention.

Next, in the step shown in FIG. 25, the second organic insulating film 45 is patterned to form the contact hole 46 on the source electrode 33.

Figure 26:
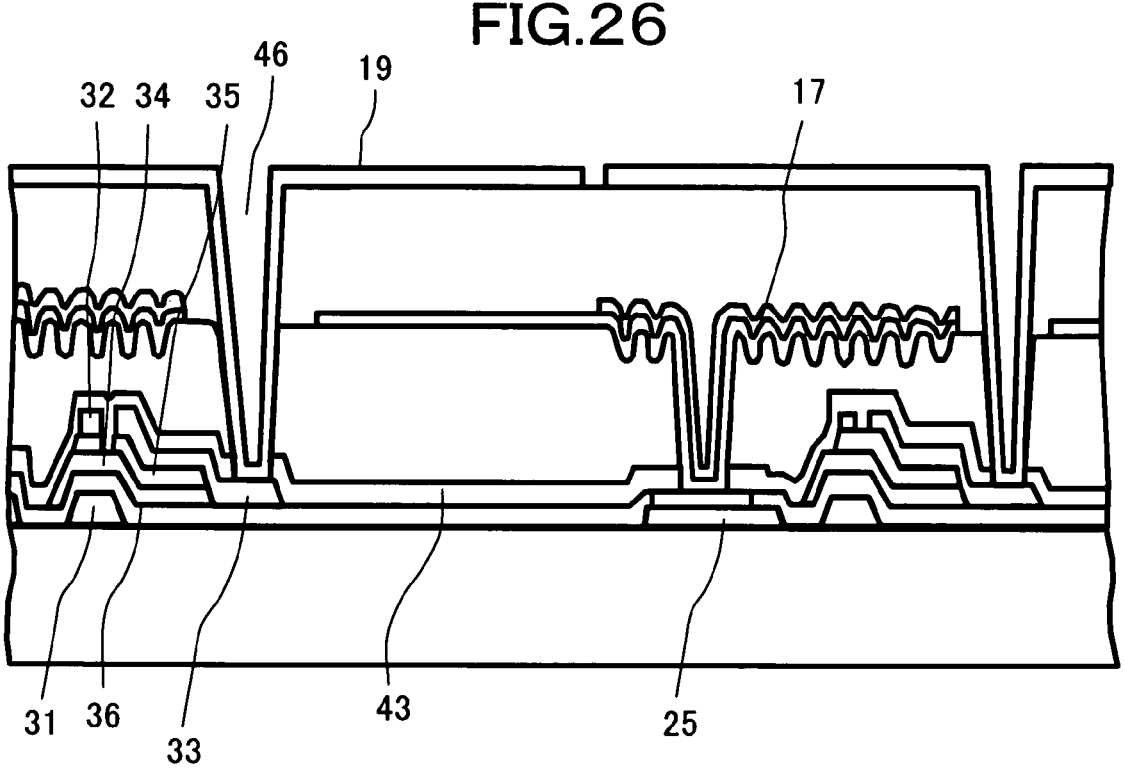
FIG. 26 is a schematic cross-sectional diagram showing a step in manufacturing the pixel portion of the liquid crystal display device that is an embodiment of the present invention.

Next, in the step shown in FIG. 26, the second transparent conductive film 19 is formed on the second organic insulating film 45 and thereafter patterned to form the pixel electrode 19. The pixel electrode 19 and the reflective electrode 17 are capable of forming a capacitance via the second organic insulating film 45.

As described above, according to the present invention, it becomes possible to stably form two organic resin films in a connection terminal portion of a liquid crystal display device disposed with the reflective region 11 and the transmissive region 12.

It will be noted that although the second insulating film 45 was described as an organic resin film in the present embodiment, an inorganic resin film has the same effects as long as it is an insulating film that is applied.

What is claimed is:

1. A display device comprising:
    pixel portions arranged in a matrix on a substrate;
    connection terminals that supply signals to the pixel portions;
    a first insulating film disposed on the connection terminals;
    a second insulating film formed on the first insulating film;
    a first conductive film disposed between the first insulating film and the second insulating film of the pixel portions;
    a second conductive film disposed on the first conductive film, with the second insulating film being interposed between the second conductive film and the first conductive film; and
    contact holes disposed in the first and second insulating films on the connection terminals,
    wherein
    side surfaces of the first insulating film in which the contact holes are formed have a first angle with respect to the substrate,
    side surfaces of the second insulating film in which the contact holes are formed have a second angle with respect to the substrate, and
    the first angle is smaller than the second angle.

2. The display device according to claim 1, wherein the first conductive film forms opposing electrodes and the second conductive film forms pixel electrodes.

3. The display device according to claim 1, wherein the first conductive film forms opposing electrodes, reflective electrodes are formed on the opposing electrodes, and the second conductive film forms pixel electrodes.

4. A display device comprising:
    pixels arranged in a matrix on a substrate;
    connection terminals that supply signals to the pixels;
    a first organic insulating film disposed on the substrate;
    a second organic insulating film formed on the first organic insulating film;
    concavo-convexities formed in the first organic insulating film;
    a first conductive film disposed on the concavo-convexities of the first organic insulating film;
    a second conductive film disposed on the second organic insulating film; and
    contact holes disposed in the first and second organic insulating films on the connection terminals,
    wherein
    side surfaces of the first organic insulating film that form inner walls of the contact holes have a first angle with respect to the substrate,
    side surfaces of the second organic insulating film that form inner walls of the contact holes have a second angle with respect to the substrate, and
    the first angle is smaller than the second angle.

5. The display device according to claim 4, wherein opposing electrodes are formed by the first conductive film and pixel electrodes are formed by the second conductive film.

6. The display device according to claim 4, wherein opposing electrodes are formed by the first conductive film, reflective electrodes are formed on the opposing electrodes, and pixel electrodes are formed by the second conductive film.

* * * * *